Figure 1:
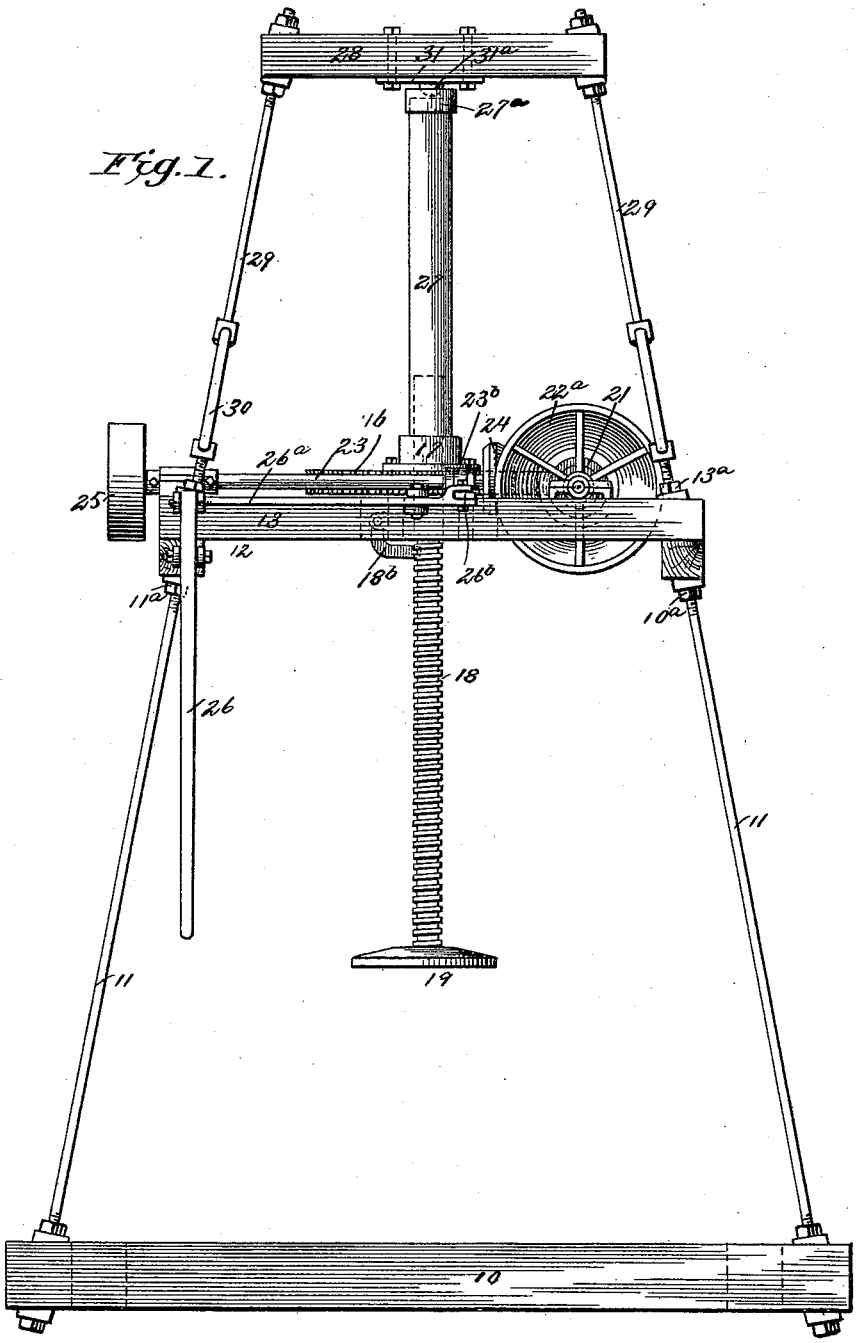

(No Model.) 2 Sheets—Sheet 1.

T. J. ASHBY & A. D. MELTON.
PRESS.

No. 461,304. Patented Oct. 13, 1891.

WITNESSES:
Fred G. Dieterich
Wd. Blondel.

INVENTORS:
Theodore J. Ashby,
Archibald D. Melton.
BY Munn & Co.
ATTORNEYS (No Model.) 2 Sheets—Sheet 2.
T. J. ASHBY & A. D. MELTON.
PRESS.
No. 461,304. Patented Oct. 13, 1891.
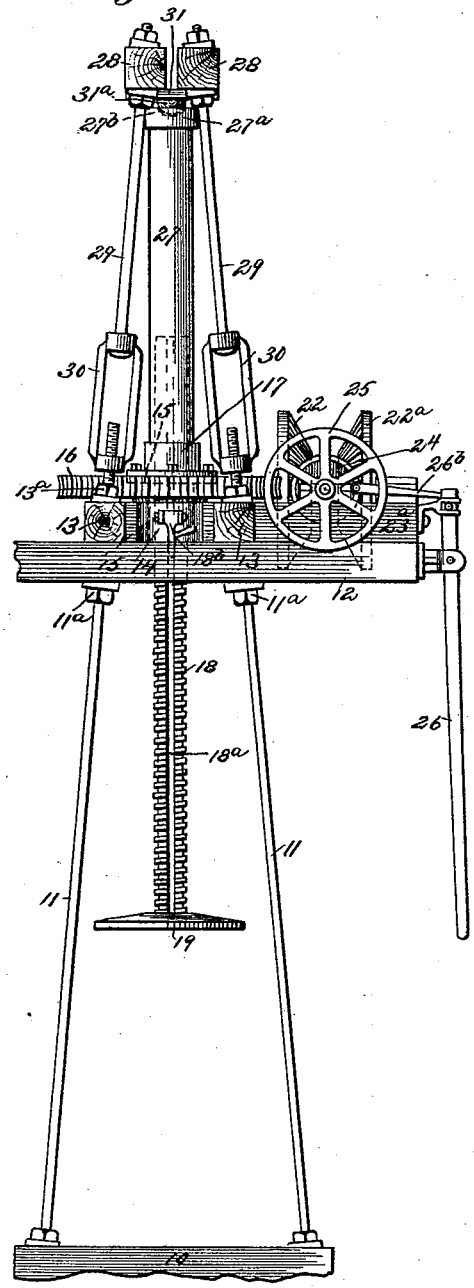
WITNESSES:
Fred G. Dieterich
W. D. Blondel.
INVENTORS
Theodore J. Ashby.
Archibald D. Melton.
BY 
ATTORNEYS

UNITED STATES PATENT OFFICE.

THEODORE J. ASHBY AND ARCHIBALD D. MELTON, OF SEBREE, KENTUCKY.

PRESS.

SPECIFICATION forming part of Letters Patent No. 461,304, dated October 13, 1891.

Application filed December 26, 1890. Serial No. 375,909. (No model.)

*To all whom it may concern:*

Be it known that we, THEODORE J. ASHBY and ARCHIBALD D. MELTON, of Sebree, in the county of Webster and State of Kentucky, have invented a new and useful Improvement in Presses, of which the following is a specification.

Our invention relates, generally, to presses, and more particularly to that class thereof known as "screw - presses," wherein the plunger is carried upon a screw-shaft which is reciprocated by a peculiarly constructed and arranged mechanism.

The object of our invention is to provide a simple, cheap, and efficient mechanism for reciprocating the plunger; and with this object in view our invention consists in the peculiar construction of the various elements and their novel combination or arrangement, all of which will be more fully hereinafter described, and pointed out in the claims.

In the drawings forming a part of this specification, Figure 1 is a front elevation of our improved press. Fig. 2 is an end elevation. Fig. 3 is a top plan view of the mechanism for operating the screw.

In constructing our improved press we employ a base 10, essentially rectangular in shape, and upwardly from each corner of said base extend the bars or rods 11, said bars preferably converging slightly and supporting near their upper ends a rectangular open frame 12, the ends of said rods or bars being threaded and passed through the side timbers of the frame, said timbers resting upon the nuts 11$^a$, arranged upon the threaded portion of the bars beneath the frame. The frame 12 is provided with two parallel central cross-beams 13, which rest upon the side timbers and are secured thereto by the threaded ends of the rods or bars 11 passing therethrough and the nuts 13$^a$ on the rods turned down upon said cross-beams. By means of the threaded rods and the nuts 11$^a$ and 13$^a$ the level of the frame can be adjusted as desired and the rigidity of the frame always maintained.

A bearing-block 14 is secured between the central cross-beams of the frame, and in said bearing is journaled the tubular hub 15 of a worm-gear 16. A collar 17, having an annular flange, is bolted to the upper face of the tubular hub 15, the bore of said collar having a screw-thread produced therein adapted to receive the threaded shaft 18, which is passed up through the bearing-block 14 and tubular hub 15. A follower 19 is arranged upon the lower end of the threaded shaft, said shaft 18 being formed with a longitudinal groove 18$^a$, in which rests a dog 18$^b$, pivoted to the side of the bearing-block 14, said dog serving to prevent the threaded shaft turning, whereby said shaft is reciprocated when the threaded collar is turned in different directions.

A shaft 20 is journaled upon the cross-beams 13 and transverse to the same, said shaft carrying a worm 21, adapted to mesh with and revolve the worm-gear 16. Beveled gears 22 and 22$^a$ are mounted rigidly upon the shaft 20 near the end of the same, said gears being arranged a short distance apart, with their beveled faces opposing each other. A shaft 23, parallel with the cross-beams, is journaled upon one of the side beams and a short beam 23$^a$, said shaft having a conical gear 24 mounted upon its inner end, adapted to mesh with either of the beveled gears, and upon the outer end of said shaft 23 is mounted a drive-pulley 25, which receives motion from a belt. (Not shown.) The drive-pulley being in motion, the shaft 23 is revolved, and the conical gear being in mesh with one of the beveled gears the worm-shaft will be revolved, the worm-gear turned and with it the threaded collar, and the threaded shaft being held rigid with regard to rotary motion it will be moved either upward or downward, according to the revolution of the worm-shaft. In order to throw the conical gear in and out of mesh with the different gears we provide a journal-bearing 22$^b$ upon the short beam 23$^a$, which bearing is capable of moving upon said beam in a direction transverse to the axis of the shaft 23, and to operate said bearing we provide a hand-lever 26, pivoted to the end of a side timber, the upper end of said lever being connected to one end of a lever 26$^a$, pivoted to the frame 12, the opposite end of the lever 26$^a$ being connected to the linkrod 26ᵇ, which is pivoted to the bearing 23ᵇ, whereby when the hand-lever is operated the motion is communicated to the bearing 23ᵃ and the conical gear thrown into gear with the beveled wheel desired.

A cylindrical casing 27 is rigidly connected to the threaded collar 17, extending upward therefrom a considerable distance, and is closed at its upper end by means of a cap 27ᵃ, which has a hemispherical socket 27ᵇ produced in the upper face of the same. Cross-timbers 28 are supported above the cylindrical casing by means of the rods 29, which rods support said timbers in the same manner as the frame 12 is supported upon the rods 11, the rods 29 being connected to the rods 11 by the swivel-joints 30, as most clearly shown. The cross-timbers are connected with each other by means of a metallic bearing-plate 31, secured to the under side of the same, said plate having a protuberance 31ᵃ, adapted to fit the socket 27ᵇ and provide a bearing for the upper end of the cylindrical casing, a suitable lubricant being retained within the socket.

The material to be pressed is placed upon the base or platform 10 beneath the follower, and, as the shaft 23 is usually in motion, by operating the hand-lever and throwing the conical gear in mesh with the proper beveled gear the worm-shaft will be revolved, revolving the worm-gear and threaded collar, whereby the threaded shaft is made to descend, compressing the material between the follower and the base or platform.

Having thus described our invention, what we claim is—

1. The combination, with a frame, of the bearing-block secured thereto, the revoluble worm-gear having a tubular hub, the internally-threaded collar secured to the tubular hub, the screw, the pivotal dog resting in a longitudinal groove in the same and locking the screw against rotary movement, a cylindrical casing rigidly secured to the threaded collar, said casing having a socketed cap, the top cross-timbers, and the bearing-plate secured thereto, adapted to engage the socketed cap, substantially as and for the purposes described.

2. The combination, with a frame, of the bearing-block, the worm-gear having a tubular hub, the internally-threaded collar rigid therewith, the worm-shaft, oppositely-arranged beveled gears, the conical gear, transversely-movable shaft and levers for moving the same, the threaded shaft having a longitudinal groove, and a dog pivoted to the bearing-block and adapted to rest in the groove and lock the shaft against a rotary movement, substantially as shown and described.

THEODORE J. ASHBY.
ARCHIBALD D. MELTON.

Witnesses:
C. M. BIGGS,
ORLANDO P. SELLERS.